3,806,554
PROCESS FOR THE MANUFACTURE OF
MONOVINYLACETYLENE
Alexander Ohorodnik, Erftstadt Liblar, Klaus Gehrmann, Knapsack, Gunther Legutke, Bruhl, and Hermann Vierling, Hurth, Germany, assignors to Knap Aktiengesellschaft, Knapsack, near Cologne, Germany
No Drawing. Filed Apr. 20, 1973, Ser. No. 353,200
Claims priority, application Germany, Apr. 27, 1972,
P 22 20 596.5; Oct. 14, 1972, P 22 50 494.5,
P 22 50 480.9
Int. Cl. C07c 11/22
U.S. Cl. 260—678
12 Claims

ABSTRACT OF THE DISCLOSURE

Monovinylacetylene is produced by the introduction of acetylene into an aqueous, hydrochloric acid solution of copper (I) chloride (Nieuwland catalyst type solution). More particularly, the catalyst solution is used in admixture with an alkali metal salt of a compound having at least one acid and one basic nitrogen-containing group, in the molecule. In this process, it is possible for the catalyst to be admixed jointly and simultaneously with acetylene and an inert organic solvent extractant and stripping agent for the resulting monovinylacetylene, the solvent being used in vapor form and being continuously passed through the catalyst solution so as to strip off monovinylacetylene originating from dimerized acetylene. It is also possible for the catalyst solution to be used in further admixture with an organic monovinylacetylene-solvent, which has a boiling point higher than substantially 150° C., is immiscible with the said solution and contains at least 40 weight percent of indan together with further mononuclear aromates. The catalyst solution and the solvent are mechanically dispersed by introducing acetylene thereinto with the resultant formation of a homogeneous catalyst liquid having between 25 and 85% by volume of the solvent therein. The dispersed solvent, which is saturated with monovinylacetylene, is continually treated with an excess of acetylene gas so as to remove monovinylacetylene therefrom, and pure monovinylacetylene is recovered from the issuing gas mixture.

---

It is known that monovinylacetylene can be produced by introducing acetylene into an aqueous hydrochloric acid solution of copper (I) chloride/alkali metal chloride (Nieuwland catalyst) at temperatures between 40 and 100° C., at atmospheric or elevated pressure. This reaction, which does not stop at the monovinylacetylene stage, has been found to effect the addition of further quantities of acetylene to the terminal triple bond. For example, complex-bound monovinylacetylene undergoes further reaction with acetylene to hexadiene-1-ine

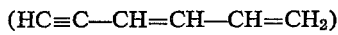

complex bound acetylene further reacts with monovinylacetylene to divinylacetylene

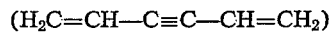

or with two mols of monovinylacetylene to octatetraene. As a result, the yield of desirable product is considerably reduced by the formation of these byproducts which cannot be put to commercial use. Aside from the loss of material caused thereby, the above byproducts give rise to considerable technological difficulties during operation, as they are readily polymerizable and combine this with readiness to form peroxides (e.g. divinylacetylene) with minor proportions of oxygen. The properties of polymeric acetylenes handicap the reaction and render operation hazardous. Attempts have therefore been made in industry to minimize the formation of byproducts.

German published specification "Offenlegungsschrift" 1 543 129 describes a process for making monovinylacetylene by introducing acetylene at temperatures between 40 and 100° C., under acetylene gas pressures between 0.01 and 10 atmospheres (gauge) into an aqueous, hydrochloric acid solution of copper (I) chloride (Nieuwland catalyst type solution). More particularly, acetylene is introduced jointly and simultaneously with an inert organic solvent as an extractant and stripping agent for monovinylacetylene, into the catalyst solution. The solvent is used in vapor form and passed continuously through the catalyst solution and monovinylacetylene, originating from dimerized acetylene, is continuously removed therefrom by stripping. Following this, the issuing vapor mixture is freed from monovinylacetylene in known manner, by condensation and fractional distillation. Fully discussed in the above German published specification 1 453 129 are the prior processes of German Pat. 1 054 989 and U.S. Pat. 2,934,576 for making monovinylacetylene from acetylene, and the disadvantages which are associated therewith.

In all of these prior processes for making monovinylacetylene, attempts have been made to improve the yield of desirable material by steps which substantially relate, and are confined, to the rapid removal of the monovinylacetylene produced from the reaction zone. Speaking generally, a dilution effect is produced by means of the extractant and/or stripping agent, or by high gas load.

The present invention, which enables the monovinylacetylene yield to be consid:rably improved, relates more particularly to a process for making monovinylacetylene by the introduction of acetylene, at temperatures between 40 and 100° C. and under acetylene gas pressures between 0.01 and 10 atmospheres (gauge), into an aqueous, hydrochloric acid solution of copper (I) chloride (Nieuwland catalyst type solution), which process comprises using the catalyst solution in admixture with an alkali metal salt of compounds having at least one acid and one basic nitrogen-containing group, in the molecule.

Further embodiments of the process of the present invention, which can be used singly or in combination, comprise:

(a) using the catalyst solution in admixture with an alkali metal salt of an aminocarboxylic acid or an aminosulfonic acid;
(b) using the catalyst solution in admixture with an alkali metal salt of nitrilotriacetic acid, ethylene-diaminotetracetic acid, taurine, glycine, α-alanine, β-alanine, ortho-, meta- or para-aminobenzoic acid;
(c) using the alkali metal salts of the above compounds in a proportion between 0.1 and 10 weight percent, preferably 1 and 5 weight percent, based on the weight of the catalyst solution.

It has already been reported in the literature that hydrogen chloride critically determines the formation of monovinylacetylene and its by-products. As taught by O. A. Tschaltikjan, Journal für Allgemeine Chemie (Russian) 18 (1948), pp. 1626/37, 2 mols of HCl are initially set free upon the introduction of acetylene into a solution of copper (I) chloride/alkali metal chloride. During the further course of the reaction, these two mols of HCl are stoichiometrically consumed for the dimerization of acetylene to monovinyl-acetylene and for the re-formation of the copper (I) complex. Experience has shown, however, that hydrogen chloride is expelled under commercial conditions from the catalyst solution and partially bound in chemically irreversible fashion, e.g. by the formation of vinyl chloride and 2-chlorobutadiene-(1,3). These losses of HCl must be compensated continually by the addition of fresh HCl. The presence merely of a minor excess of HCl on the other hand has been found to strongly increase byproduct formation (aldehyde and vinyl chloride) and simultaneously to reduce the conversion to monovinylacetylene.

These are disadvantageous phenomena which are substantially avoided in the process of the present invention.

The alkali metal salts of compounds containing acid and basic groups obviously cause the hydrogen chloride to be loosely linked to the basic group, and this primarily avoids discharge or consumption by side reactions. As a salt of a weak base, it is possible for buffered hydrogen chloride substantially more favorably to influence the equilibrium reactions, which make their contribution to the formation of monovinylacetylene, than free hydrogen chloride.

The advantages offered by the present invention substantially reside in the fact that the yield of monovinylacetylene can be improved by means of substances inhibiting the further reaction of monovinylacetylene. These substances, which are added once, make it unnecessary for the monovinylacetylene to be removed from the reaction zone in the costly manner described, for example in the processes of German Pat. 1,054,989 and U.S. Pat. 2,934,576. To arrive at the improved monovinylacetylene yield, it is merely necessary in accordance with this invention to slightly modify the catalyst solution without any modification of machinery or technology. As a result, the process of this invention can readily be practiced in any commercial plant producing monovinylacetylene.

The step of separating the monovinylacetylene, which does not form part of the invention, can be effected in art-recognized manner, for example by subjecting the reaction mixture coming from the catalyst solution to washing with acetone or to freezing treatment at substantially —70° C. so as to separate monovinylacetylene therefrom, which is purified by distillative treatment.

While the composition of the Nieuwland catalyst solution does not form part of the invention, it should conveniently contain up to 5 weight percent, preferably between 0.1 and 0.2 weight percent, of free hydrochloric acid, if desired in admixture with known complex formers for copper (I) chloride, such as alkali metal chlorides, ammonium chlorides, amine-hydrochlorides or suitable mixtures thereof, and it should preferably have a catalyst density between 1.3 and 1.8 grams/cc., more preferably 1.6 grams/cc.

By combining the process of the present invention with that disclosed in German published specification "Offenlegungsschrift" 1 543 129, it is unexpectedly possible to even further and considerably improve the yield of monovinylacetylene, and this for substantially unchanged acetylene conversion rates.

The present invention accordingly also relates to a process for making monovinylacetylene by introducing acetylene, at temperatures between 40 and 100° C. and under acetylene gas pressures between 0.01 and 10 atmospheres (gauge), into an aqueous, hydrochloric acid solution of copper (I) chloride (Nieuwland catalyst solution), the catalyst solution being used in admixture with an alkali metal salt of compounds containing at least one acid and one basic group, in the molecule, which process comprises introducing, into the catalyst solution, acetylene jointly and simultaneously with an inert organic solvent extractant or stripping agent for the resulting monovinylacetylene, the solvent being used in vapor form and being continuously passed through the catalyst solution so as to strip off monovinylacetylene originating from dimerized acetylene.

Further embodiments of the present invention, which can be used singly or in combination and which are similar to those reported in German published specification "Offenlegungsschrift" 1 543 129, comprise:

(a) introducing the inert solvent in liquid or vapor form into the catalyst solution;

(b) using an inert solvent boiling at temperatures substantially between 20° C. and less than 100° C.;
(c) using the inert solvent in proportions substantially between 5 and 50% by volume, based on the total gas volume;
(d) selecting the inert solvent from methanol, benzene, chloroform, acetonitrile, acetone, n-hexane or methylethylketone.

Steps, which are taken in an attempt to improve the yield of desirable substance, should neither impair the space/time-yield nor render a process more costly, as this is of prime importance to the economy of any process. It is also an important requirement for such improvement steps to avoid or substantially avoid the need for constructional modification of technical facilities.

As shown in the following examples, the yield-improving steps of the present invention are free from any disadvantageous effects and even combine this with technologically valuable effects.

Examples 1 and 23 below demonstrate the behaviour of a prior art Nieuwland catalyst. Example 23 demonstrates more particularly how the yield can be improved with the use of the catalyst employed in Example 1, provided that the monovinylacetylene produced is continually removed from the reaction zone by subjecting it to stripping treatment with acetone.

Example 24 demonstrates the combined use of the steps disclosed in Examples 23 and 5, respectively, i.e. their use in accordance with this invention.

By further improving the process of the present invention, it is unexpectedly possible to further and considerably increase the monovinylacetylene yields. This further improvement comprises using the catalyst solution in further admixture with an organic monovinylacetylene-solvent boiling at temperatures higher than substantially 150° C., immiscible with the said solution and containing at least 40 weight percent of indan together with further mononuclear aromates; mechanically dispersing the said catalyst solution and the said solvent by introducing acetylene thereinto with the resultant formation of a homogeneous catalyst liquid having between 25 and 85% by volume, preferably between 30 and 60% by volume, of the solvent therein; continually stripping off monovinylacetylene from the dispersed solvent, which is saturated with monovinylacetylene, by introducing an excess of acetylene gas thereinto; and recovering pure monovinylacetylene from the issuing gas mixture.

The preferred solvent is a coke plant-product substantially of the following composition, in weight percent.

Xylenes: 1–2
Cumene: 2–5
Mesitylene: 5–15
Pseudocumene: 10–20
Indan: 40–80, preferably 50
Tetralin: 5–15.

This product is commercially available and marketed under the designation of "Arsol" by ARAL company.

Following the teachings of German Pat. 1 070 619 and U.S. Pat. 2,934,576, it is possible for a customary Nieuwland catalyst to be used in admixture with certain aromatic hydrocarbons, such as toluene, xylene, cumene, mesitylene, Tetralin, cetyl chloride, monochlorobenzene, ortho-dichlorobenzene or chloro-naphthalene, the aromates replacing aliphatic or cycloaliphatic hydrocarbons. It is often necessary, however, to also add one or more dispersing agents. These addends are not only intended to dissolve monovinylacetylene but also and more importantly to dissolve the considerable quantities of tar originating from polymeric by-products. A portion of the catalyst liquid is continuously removed and delivered to a calming zone, wherein it separates into two layers comprising an aqueous catalyst phase and an organic solvent phase. The former is repumped to the reactor and the latter, which contains tar products, consisting partially of peroxides and acetylides, and which is hazardous to remove by distillation, is generally discarded. It should also be borne in mind that the reactors containing the inhomogeneous catalyst liquid are fitted with agitators and recirculation means. Continuous purification of the catalyst liquid by means of agitators and pumps is a commercially unattractive and costly procedure and, with the possibility in mind that peroxides and, for example copper acetylides, may well give rise to explosions, scarcely safe enough to justify use thereof in modern commercial plants producing monovinylacetylene. More particularly splashes of catalyst liquid urged into contact with the wall of the reactor by the paddle or blade mixers are not always rinsed away timely enough. As a result, dry and highly explosive copper acetylide is found to adhere to the inside wall of the reactor.

While U.S. Pat. 2,934,576 at first glance would appear, aside from the disadvantageous phenomena reported above, to enable very good acetylene conversion rates and monovinylacetylene yields to be produced, the fact remains that the experiments therein were made with merely 10 cc. of catalyst liquid and for a mere period between 45 and 165 minutes. Depite this, the catalyst activity was found to drop considerably, after a short while. In this process, merely the quantity of acetylene which just undergoes dissolution and reaction is added. Such small-scale experiments, however, disclose nothing that would be applicable to the commercial production of monovinylacetylene, wherein it is necessary for the resulting monovinylacetylene to be always expelled from the catalyst liquid by means of considerable excess proportions of acetylene.

The process of the present invention can be carried out in any existing reactor for making monovinylacetylene without the need to use pumps for the continuous removal and decontamination of the catalyst, or agitators and the like. The catalyst solution and the aromatic solvent, which is used in accordance with this invention and which has at least 40 weight percent of indan therein—this is characteristic of, and critical for, the present invention—have unexpectedly been found to produce a homogeneous catalyst emulsion, once acetylene is passed therethrough without any addition of dispersing agents. Indan (hydrindene) has a boiling point of 177° C. (760 mm. Hg), a density of 0.957 g./cc. and is a very good solvent for monovinylacetylene. In other words, the aromatic solvent ensures particularly rapid extraction of monovinylacetylene from the aqueous catalyst solution and inhibits further reaction thereof. In the process of the present invention, it has been found unnecessary in continuous operation for a period of at least 1 year to open and clean the reactor charged with catalyst liquid, which is difficult to handle. The catalyst liquid remained fully active in the absence of any formation of tar products. The only byproduct of high molecular weight was divinylacetylene, which was obtained at a rate between 1 and 2 weight percent, based on the monovinylacetylene produced. The polymerization of divinylacetylene under the operational conditions of the present invention gives merely rise to an extremely minor formation of products of higher molecular weight. This firstly in view of the fact that a very minor absolute quantity of divinylacetylene is obtained in the present process and secondly in view of the fact that the divinylacetylene immediately undergoes dissolution in the considerable quantity of aromatic solvent present and conversion to a form in which it is scarcely polymerizable. The concentration of divinylacetylene in the aromatic solvent cannot reasonably be expected to increase under the operational conditions selected as it escapes in gaseous form, for example at reaction temperatures between 70 and 80° C. and under a gas load between 100 and 150 liters of gas per liter of catalyst per hour.

The process of the present invention combining two different steps with one another differs basically from all processes known for making monovinylacetylene. The first of these steps comprising admixing the catalyst solution with an alkali metal salt of a compound containing at least one acid and one basic nitrogen-containing group, favorably influences the reaction mechanism underlying the formation of monovinylacetylene, while the second step, which ensures rapid dissolution of the monovinylacetylene, immediately after formation, in the aromatic solvent having at least 40 weight percent of indan therein, and which inhibits further reaction of the monovinylacetylene, favorably acts on the reaction kinetics of the same reaction.

The present invention has also been found to ensure considerable technologically valuable effects provided that use is made of one and the same aromatic solvent, for example "Arsol," both in the reactor for extracting the monovinylacetylene, and in the work-up for scrubbing the monovinylacetylene and obtaining it in pure form (cf. e.g. German Pat. 1 096 344).

Example 25 of the following examples illustrates the improved yield which is obtained upon partial replacement of the catalyst of Example 1 by "Arsol."

Examples 26 to 28 illustrate the process of the present invention, wherein the step disclosed in Example 25 is combined with that described in Example 5. The examples show that the conversion rate and yield are a function of the ratio by volume of "Arsol" to catalyst solution. Optimum results are obtained with the use of Arsol proportions between 30 and 70% by volume, based on the overall quantity of catalyst liquid. The use of increased proportions of Arsol effects increased yields of monovinylacetylene, while the acetylene conversion rate begins to decrease appreciably from an "Arsol" concentration of 60% by volume upward.

It has already been reported that the acetylene conversion rate and the yield of monovinylacetylene are influenced by the catalyst composition, acid concentration, catalyst density, reaction temperature, pressure and gas load, upon the dimerization of acetylene in the Nieuwland catalyst. In order to eliminate the influence of these factors, use was made of a commercial catalyst rather than of a fresh catalyst. In addition to this all experiments were made in one and the same reactor and under identical conditions. This was done to reliably establish the correlation existing between the experimental step and the test results. This is true concerning all of the examples.

EXAMPLES 1 TO 10

A jacketed reactor 1.5 m. high with an internal diameter of 5 cm. was fed with 5 liters of a Nieuwland catalyst solution, which was taken from a commercial reactor and which was composed of:

33.4 weight percent of copper (I) chloride,
25.0 weight percent of potassium chloride,
0.1 weight percent of hydrogen chloride, and
41.5 weight weight percent of water.

The solution had a density of 1600 g./l. at 80° C.

The catalyst solution was heated to 80° C. and 560 normal liters/hr. (S.T.P.) of acetylene and 190 normal liters/hr. of nitrogen were introduced thereinto, through the bottom portion of the reactor.

In all of the examples, the following reaction conditions were maintained constant:

Catalyst temperature: 80° C.
Gas pressure at reactor inlet: 0.2 atm. (gauge).
Gas load: 150 liters of gas/l. of catalyst.
Composition of gas: 75% by volume of acetylene, 75% by volume of nitrogen.

The gas coming from the reactor was subjected to gas-chromatography and the results obtained were used to identify the acetylene conversion rate and yield of monovinylacetylene. Three evaluations were made for each of the examples so as to obtain a mean value which is indicated in Table I hereinafter.

Example 1 demonstrates the behaviour of a customary prior art Nieuwland catalyst. Examples 2 to 5 demonstrate the improved effects produced by the catalyst of the present invention, by the addition of increasing proportions of the sodium salt of nitrilotriacetic acid

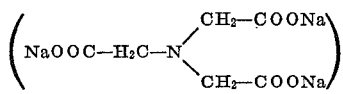

Examples 6 to 10 illustrate the behaviour of an improved catalyst, after 1, 2, 3, 4 and 5 days, respectively.

It can clearly be seen that the improved monovinylacetylene yields are a function of the quantity of Na-salt of nitrilotriacetic acid added.

of β-alanine $H_2N-CH_2-CH_2COONa$ (Example 20) and ethylenediaminotetracetic acid

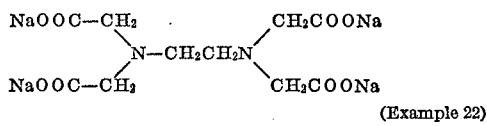

(Example 22)

Examples 19 and 21 are comparative examples which were carried out without catalyst additon, to Examples 20 and 22.

The composition, quantity and density of the catalyst, the apparatus and the reaction conditions were the same as those reported in Examples 1 to 10.

TABLE I.—EXAMPLES 1 TO 10

| Example number | Catalyst addition of NTE-salt | | | Yield based on acetylene converted (percent) | | | | | Acetylene conversion rate (percent) |
|---|---|---|---|---|---|---|---|---|---|
| | Grams | Mol [257] | weight percent | MOVA | DIVA | Acetaldehyde | VC | CB | |
| 1 | | | | 77.75 | 15.3 | 5.85 | 0.27 | 0.97 | 17.5 |
| 2 | 31 | 0.122 | 0.4 | 80.3 | 14.1 | 4.75 | 0.16 | 0.33 | 17.0 |
| 3 | 105 | 0.40 | 1.3 | 83.9 | 12.3 | 3.38 | 0.16 | 0.32 | 18.0 |
| 4 | 168 | 0.65 | 2.1 | 87.5 | 9.1 | 3.10 | 0.12 | 0.20 | 17.5 |
| 5 | 210 | 0.815 | 2.6 | 90.5 | 6.7 | 2.4 | 0.1 | 0.2 | 18.5 |
| 6 | 210 | 0.815 | 2.6 | 90.2 | 6.9 | 2.5 | 0.1 | 0.1 | 18.3 |
| 7 | 210 | 0.815 | 2.6 | 90.7 | 6.8 | 2.2 | 0.1 | 0.2 | 18.4 |
| 8 | 210 | 0.815 | 2.6 | 89.2 | 8.0 | 2.5 | 0.1 | 0.2 | 13.8 |
| 9 | 210 | 0.815 | 2.6 | 90.3 | 7.0 | 2.4 | 0.1 | 0.2 | 18.4 |
| 10 | 210 | 0.815 | 2.6 | 90.5 | 6.8 | 2.5 | 0.1 | 0.1 | 18.3 |

NOTE.—In the table, the following abbreviations have the following meanings: MOVA=monovinylacetylene; DIVA=divinylacetylene; VC=vinyl chloride; CB=2-chlorobutadiene-(1,3); NTE-salt=sodium salt of nitrilotriacetic acid.

EXAMPLES 11 TO 18

A reactor the same as that used in Examples 1 to 10 was charged with 5 liters of a catalyst, which was taken from a commercial reactor and which was composed of:

28.8 weight percent of CuCl,
26.3 weight percent of KCl,
0.2 weight percent of HCl and
44.7 weight percent of water.

The solution had a density of 1600 g./l. at 80° C.

The acetylene was reacted under conditions the same as those described in Examples 1 to 10.

To demonstrate the improved yields which were produced in the process of the present invention, Example 11 was carried out without, and Examples 12 to 16 were carried out with, the addition of increasing proportions of sodium taurate ($H_2N-CH_2-CH_2-SO_3Na$) to the catalyst. Examples 17 and 18 show the behaviour of an improved catalyst, after 1 and 2 days, respectively. The results obtained are indicated in Table II. Here again, as can clearly be seen, the improved yields are found to be a function of the quantity of Na-taurate added.

| Example | 19 | 20 | 21 | 22 |
|---|---|---|---|---|
| Addition of catalyst solution. | | β-alanine | | Na-salt of ethylene-diaminotetracetic acid. |
| Quantity of addend (g.) | | 111 (1 mol) | | 352 (0.93 mol). |
| Acetylene conversion rate (percent). | 17.8 | 15.0 | 15.5 | 15.0. |
| Yield based on C₂H₂ (percent): | | | | |
| MOVA | 75.0 | 90.0 | 75.35 | 89.60. |
| DIVA | 17.71 | 6.9 | 17.75 | 6.69. |
| Acetaldehyde | 6.1 | 3.1 | 6.27 | 3.71. |
| VC | 0.26 | <0.01 | 0.27 | <0.01. |
| CB | 0.87 | <0.01 | 0.36 | <0.01. |

EXAMPLE 23.—Comparative experiment

The procedure described in Example 1 was repeated save that the nitrogen in the gas mixture was replaced by the same quantity (25% by volume) of acetone in vapor form. The reaction gas was analyzed and the test results were evaluated in a manner analogous to that described in Example 1. The results obtained are indicated in Table III.

TABLE II.—EXAMPLES 11 TO 18

| Example number | Catalyst addition of Na-taurate | | | Yield based on acetylene converted (percent) | | | | | Acetylene (percent) |
|---|---|---|---|---|---|---|---|---|---|
| | Grams | Mol [147] | Weight percent | MOVA | DIVA | Acetaldehyde | VC | CB | |
| 11 | | | | 73.9 | 17.6 | 7.3 | 0.27 | 0.9 | 16.0 |
| 12 | 73 | 0.5 | 0.9 | 76.6 | 15.92 | 6.8 | 0.20 | 0.4 | 15.5 |
| 13 | 147 | 1.0 | 1.8 | 79.2 | 14.4 | 5.8 | 0.19 | 0.39 | 15.7 |
| 14 | 210 | 1.5 | 2.7 | 83.6 | 11.6 | 4.2 | 0.21 | 0.41 | 15.2 |
| 15 | 294 | 2.0 | 3.6 | 86.1 | 9.96 | 3.69 | 0.25 | <0.01 | 15.1 |
| 16 | 367 | 2.5 | 4.5 | 90.3 | 7.2 | 2.4 | 0.15 | <0.01 | 15.3 |
| 17 | 367 | 2.5 | 4.5 | 90.2 | 7.3 | 2.3 | 0.2 | <0.01 | 15.8 |
| 18 | 367 | 2.5 | 4.5 | 90.3 | 6.9 | 2.6 | 0.2 | <0.01 | 16.2 |

NOTE.—For explanation of abbreviations, see Table I.

EXAMPLES 19 TO 22

Improved yields analogous to those reported hereinabove were obtained by the addition of the sodium salt EXAMPLE 24.—Invention The procedure described in Example 1 was repeated, save that 2.6 weight percent of the sodium salt of nitrilotriacetic acid were added to the catalyst solution and that the nitrogen in the gas mixture was replaced by the same quantity (25% by volume) of acetone in vapor form.

The reaction gas was analyzed and the test results were evaluated in a manner analogous to that described in Example 1.

TABLE III

| Example | 1 | 23 | 5 | 24 |
|---|---|---|---|---|
| Acetylene conversion rate (percent) | 17.5 | 16.8 | 18.5 | 17.8 |
| Yield, based on acetylene converted (percent): | | | | |
| MOVA | 77.75 | 89.0 | 90.5 | 95.1 |
| DIVA | 15.3 | 8.0 | 6.7 | 2.3 |
| Acetaldehyde | 5.85 | 2.5 | 2.4 | 2.31 |
| VC | 0.27 | 0.2 | 0.1 | 0.2 |
| CB | 0.97 | 0.3 | 0.2 | 0.01 |

On comparing the results obtained in Examples 1, 23, 5 and 24, it is clearly seen that the improved yields were obtained for a constant gas load (throughput) and for a substantially constant acetylene conversion rate. In other words, the improved yields could not be found to impair the space/time-yield or capacity of the plant. The experiments also showed that the improved yield was obtained without additional expenditure. It was the result of a combination of individual known steps.

The process of the present invention also produces considerable technologically valuable effects if use is made of one and the same organic solvent, particularly acetone, as the extractant and stripping agent for monovinylacetylene and as the scrubbing agent for obtaining pure monovinylacetylene (cf. for example Germany Pat. 1 041 492).

EXAMPLE 25.—Comparative Example

The procedure was the same as that described in Example 1 save that 50% by volume (2.5 liters) of the catalyst solution were replaced by the "Arsol" solvent which had the following composition, in weight percent:

Xylenes, 1.5; cumene, 2.5; mesitylene, 11.5; pseudocumene, 16.5; indan, 61.0; Tetralin, 7.0.

The boiling range was between 160 and 205° C.

The reaction gas was analyzed and the test results were evaluated in a manner analogous to that described in Example 1. The results obtained are indicated in Table IV hereinafter.

EXAMPLES 26 to 28.—Invention

The procedure was the same as that described in Example 5 save that 25% by volume (1.25 liters; Example 26), 50% by volume (2.5 liters; Example 27) and 75% by volume (3.75 liters; Example 28 of the catalyst solution was replaced by "Arsol."

The reaction gas was analyzed and the test results were evaluated in a manner analogous to that described in Example 1.

The catalyst liquid in the production plant remained clear and did not require replacement, even after continuous operation for 1 year. The conversion rates and yields remained substantially the same; disturbances could not be found to occur.

TABLE IV

| Example | 1 | 25 | 5 | 26 | 27 | 28 |
|---|---|---|---|---|---|---|
| Acetylene conversion rate (percent) | 17.5 | 17 | 18.5 | 18.3 | 17.5 | 12 |
| Yield, based on acetylene converted (percent): | | | | | | |
| MOVA | 77.75 | 90.2 | 90.5 | 92.6 | 96.0 | 98 |
| DIVA | 15.3 | 5.2 | 6.7 | 5.2 | 1.5 | 1.0 |
| Acetaldehyde | 5.85 | 4.6 | 2.4 | 2.1 | 2.3 | 1.0 |
| VC | 0.27 | 0.2 | 0.1 | 0.1 | 0.2 | <0.1 |
| CB | 0.97 | 0.1 | 0.2 | <0.01 | <0.01 | <0.01 |

What is claimed is:

1. A process for making monovinylacetylene by the introduction of acetylene, at temperatures between 40 and 100° C. and under acetylene gas pressures between 0.01 and 10 atmospheres (gage), into an aqueous, hydrochloric acid solution of copper (I) chloride (Nieuwland catalyst solution), which process comprises using the catalyst solution in admixture with an alkali metal salt of a compound having at least one acid and one basic nitrogen-containing group, in the molecule.

2. A process as claimed in claim 1, wherein the catalyst solution is used in admixture with an alkali metal salt of an aminocarboxylic acid or aminosulfonic acid.

3. A process as claimed in claim 1, wherein the catalyst solution is used in admixture with an alkali metal salt of a substance selected from the group consisting of nitrilotriacetic acid, ethylene-diaminotetracetic acid, taurine, glycine, $\alpha$-alanine, $\beta$-alanine, ortho-, meta- and para-aminobenzoic acid.

4. A process as claimed in claim 1, wherein the alkali metal salt of the said compounds are used in a proportion between 0.1 and 10 weight percent, based on the weight of the catalyst solution.

5. A process as claimed in claim 1, comprising introducing, into the catalyst solution, acetylene jointly and simultaneously with an inert organic solvent extractant and stripping agent for the resulting monovinylacetylene, the solvent being used in vapor form and being continuously passed through the catalyst solution so as to strip off monovinylacetylene originating from dimerized acetylene.

6. A process as claimed in claim 5, wherein the inert solvent is introduced in liquid or vapor form into the catalyst solution.

7. A process as claimed in claim 5, wherein the inert solvent has a boiling point substantially between 20° C. and less than 100° C.

8. A process as claimed in claim 5, wherein the inert solvent is used in a proportion substantially between 5 and 50% by volume, based on the total gas volume.

9. A process as claimed in claim 5, wherein the inert solvent is at least one member selected from the group consisting of methanol, benzene, chloroform, acetonitrile, acetone, n-hexane or methylethylketone.

10. A process as claimed in claim 1, which comprises using the catalyst solution in further admixture with an organic monovinylacetylene-solvent boiling at temperatures higher than substantially 150° C., immiscible with the said solution and containing at least 40 weight percent of indan together with further mononuclear aromates; mechanically dispersing the said catalyst solution and the said solvent by introducing acetylene thereinto with the resultant formation of a homogeneous catalyst liquid having between 25 and 85% by volume of the solvent therein; continually stripping off monovinylacetylene from the dispersed solvent, which is saturated with monovinylacetylene, by introducing an excess of acetylene gas thereinto; and recovering pure monovinylacetylene from the issuing gas mixture.

11. A process as claimed in claim 10, wherein the solvent comprises substantially the following composition, in weight percent:

xylenes: 1–2
cumene: 2–5
mesitylene: 5–15
pseudocumene: 10–20
indan: 40–80
Tetralin: 5–15.

12. A process as claimed in claim 10, wherein the catalyst liquid has between 30 and 60% by volume of solvent therein.

References Cited

UNITED STATES PATENTS

| 2,934,576 | 4/1960 | Goffinet, Jr. | 260—678 |
| 1,926,055 | 9/1933 | Nieuwland | 260—678 |
| 2,222,394 | 11/1940 | Berg et al. | 260—678 |

DELBERT E. GANTZ, Primary Examiner

J. M. NELSON, Assistant Examiner